Figure 1:
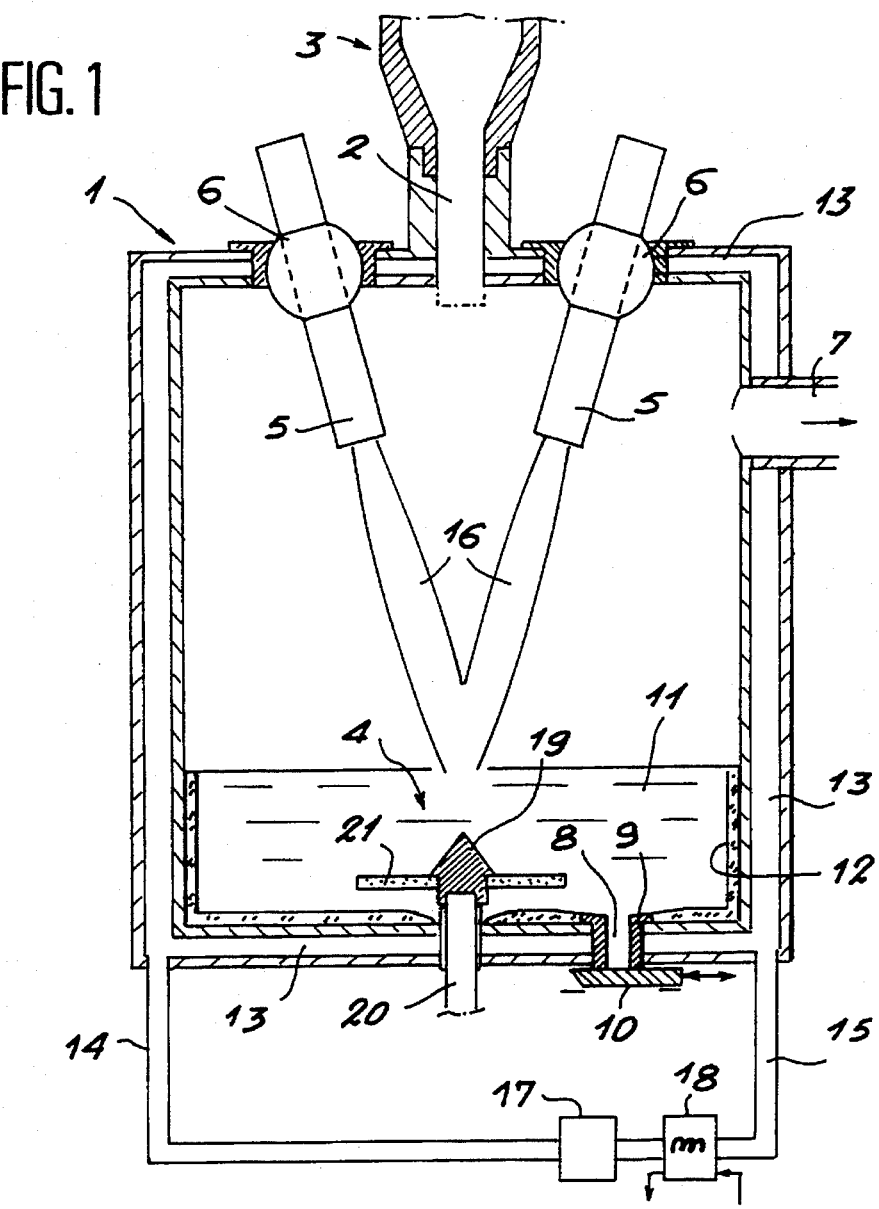

United States Patent [19]
Boen et al.

[11] Patent Number: 5,606,925
[45] Date of Patent: Mar. 4, 1997

[54] PROCESS FOR THE INCINERATION AND VITRIFICATION OF WASTE IN A CRUCIBLE

[75] Inventors: Roger Boen, Saint-Alexandre; René Cartier, Le Pontet; Jean-Pierre Taupiac, Beaumont de Lomagne; Jean-Marie Baronnet, Limoges, all of France

[73] Assignee: Commissariat A L'Energie Atomique, Paris, France

[21] Appl. No.: 319,963

[22] Filed: Oct. 7, 1994

[30] Foreign Application Priority Data

Oct. 8, 1993 [FR] France ................................. 93 12020

[51] Int. Cl.$^6$ ............................... F23G 7/00; F23G 5/00; F23G 5/10; G21F 9/00
[52] U.S. Cl. ............................. 110/346; 110/250; 110/348
[58] Field of Search .................................... 110/250, 346, 110/235, 348, 242; 219/121.38

[56] References Cited

U.S. PATENT DOCUMENTS 3,917,479 11/1975 Sayce et al. .
4,801,435 1/1989 Tylko .

FOREIGN PATENT DOCUMENTS 0312044 4/1989 European Pat. Off. .
0369642 5/1990 European Pat. Off. .
0398699 11/1990 European Pat. Off. .
2140902 12/1984 United Kingdom .

Primary Examiner—Henry A. Bennett
Assistant Examiner—Susanne Tinker
Attorney, Agent, or Firm—Michael N. Meller

[57] ABSTRACT

A process is described for the incineration and vitrification of mainly mineral waste in which at least one pure or substantially pure oxygen plasma jet is used for melting the waste, the process taking place in a metal crucible containing a tapping valve and its wall is cooled by liquids flowing in internal channels.

4 Claims, 1 Drawing Sheet

PROCESS FOR THE INCINERATION AND VITRIFICATION OF WASTE IN A CRUCIBLE

The invention relates to a process for the incineration and vitrification of waste in a crucible.

Mineral or incineratable waste, whose mineral charges are often rich in certain highly toxic or radioactive heavy metals, are often treated by heating them with a plasma torch at a temperature such that they melt and vitrify and then form a compact glass block, where the dangerous substances are enveloped. The block is then recycled or safely stored. It is therefore an advantageous and reliable process expected to undergo further development. Moreover, the organic waste which can be mixed with mineral waste is normally vaporized and the molecules thereof crack, which transforms them into simple gases, which can be easily treated by e.g. filtering and neutralizing them.

Several specific embodiments have been proposed, but they and unsatisfactory with regards to certain points. Thus, the existing crucibles are often made from refractory materials, whereof an important advantage is that they are insensitive to corrosive products such as hydrochloric acid, which result from the vaporization of the organic waste. However, it has been found that these crucibles are subject to rapid wear when in contact with molten glass and they also retain the heat produced in them so well that it is soon necessary to limit the flow rate of the source and therefore slow down the treatment capacity. Copper, which has also been proposed as a crucible construction material, suffers from the same disadvantage of being sensitive to corrosion.

Moreover, in a large number of designs, the crucible rotates so that the molten glass is subject to centrifugal forces and is forced back against the side wall during heating. The reason is that the crucible is perforated in the centre and that the tapping which takes place after heating occurs by stopping the crucible. However, it is costly to equip the crucible with rotary joints for supplying it with coolant and electricity. It has also been noted that the cracking of the gases is relatively difficult.

The object of the invention is a process avoiding the disadvantages referred to hereinbefore and involving the use of a simple, inexpensive crucible protected against corrosion by glass or other products resulting from combustion, such as the organic gases given off.

The process is characterized in that it consists of using as the plasma forming gas substantially pure oxygen in a stationary crucible having stainless steel walls with channels for the outflow of a cooling liquid and with a tapping valve.

The heat is easily dissipated by the wall and the cooling liquid, so that it is possible to introduce into the crucible mineral or incineratable waste having a high calorific power. Pure oxygen permits a rapid combustion without e.g. producing nitrogen oxide, unlike in the prior art processes where air is normally injected. Therefore the process is economic with respect to the plasma forming gas, so that in combination with a good heat discharge, it makes it possible to treat waste materials with a high flow rate.

The invention is described in greater detail hereinafter relative to the attached drawings, wherein show:

FIG. 1 a crucible according to the invention.

Figure 2:
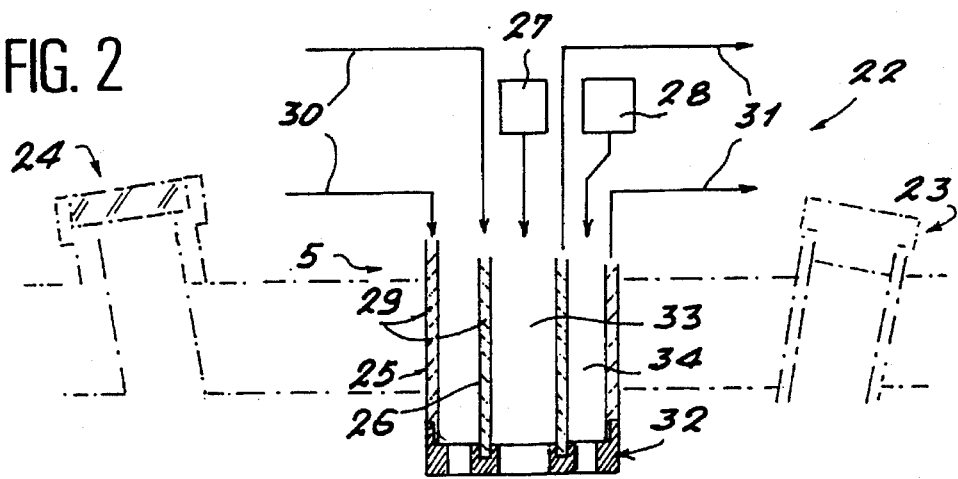

FIG. 2 in part another crucible.

The crucible of FIG. 1 is in the form of a substantially closed, cylindrical tank comprising an enveloping wall 1 perforated at the top by a waste supply opening 2 connected to a hopper 3 and which covers an electrode 4 located on the crucible bottom. Two oxygen plasma torches 5 traverse the top of the wall on either side of the supply opening 2 and are mobile in orientation by means of swivel joints 6 set in the wall 1. Moreover, the torches 5 slide in the swivel joints 6 so as to be introduceable at random into the crucible.

The side wall is perforated by a gas discharge orifice 7. The bottom is provided with a taphole 8 surrounded by a sleeve 9 and which can be closed by a sliding plate 10 located beneath the crucible 1. The sleeve 9 can be lined with a heating resistor for melting a solidified glass plug which would obstruct the taphole 8. The sleeve 9 can also be solid and made from a good heat conducting metal in order to obtain this effect. The sliding plate 10 can be provided with cooling means for as rapidly as possible forming such a solidified plug when it is put back into place for stopping tapping. French patent application 9,305,079 describes several constructions in a more complete manner. This type of valve has proved effective for reliably sealing the taphole 8. It is pointless rotating the crucible for moving away from a still open central taphole molten material by centrifuging.

The molten metal bath 11 fills the bottom of the crucible 1 and covers the electrode 4. Its layer 12 touching the wall is solidified and therefore has no detrimental effect on the wall. Thus, channels 13 traversed by cooling liquid are made in the entire crucible wall 1. It can consist of a network of vertical channels in the side wall and which are parallel to one another in the bottom and the top, which are connected to a supply duct 14 and to a discharge duct 15, said ducts being interconnected in loop form by a pump 17 and a heat exchanger in order to ensure a forced circulation and thermal equilibrium of the cooling liquid. The torches 5 emit plasma jets 16 towards the electrode 4, which is formed by a molybdenum support 19 mounted on a mast 20 traversing the crucible wall 1 and engaged in a central opening of a graphite disk 21. Like the wall 1, the mast 20 is made from stainless steel.

FIG. 2 shows another embodiment having in this case a single plasma torch 22 sliding in a central opening of the crucible top, i.e. at the location of the waste supply opening 2 of the other embodiment. The supply opening, now designated 23, extends sideways substantially at the location of one of the swivel joints 6 of the other embodiment and the crucible can be completed by a viewing or inspection window 24 oriented towards the electrode and substantially at the location of the other swivel joint 6. In this case the torch 22 is not orientable, but it can still be introduced to a greater or lesser extent into the crucible. The other details are not modified compared with FIG. 1 and are consequently not shown.

In both cases, the discharged gases can be treated by cooling them by a heat exchanger, followed by filtration and neutralization.

A description will now be given of a manner of performing the process, but for this purpose it is useful to describe in greater detail the construction of a torch 5 or 22.

There is mainly an outer sleeve 25 and an inner sleeve 26, which are concentric. The central pipe 33 defined by the inner sleeve 26 is supplied with plasma forming gas by a source 27 and the annular pipe 34 between the two sleeves 25,26 is supplied with a plasma encapsulating gas by an additional source 28. The sleeves 25,26 have cooling channels 29 connected to a pair of supply pipes 30 and to a pair of discharge pipes 31 and the end of the torch 5 or 22 is protected by a boron carbide insulating ring 32, which is hollowed out to permit the exit of the plasma forming and encapsulating gases.

In order to start or strike the plasma, the first step is to inject 15 Nl/mn of argon into the central pipe 33 of the torch 5 or 22, which is brought to an electric potential so that it serves as the cathode, followed by 5 Nl/mn of argon into the encapsulating pipe 34 and 30 Nl/mn of argon into the inspection window 24. All the openings made through the apparatus are the seat of inert gas injections for preventing excessive heating and for protecting the exterior against the discharge of any polluting or dangerous dust. The choice of argon instead of oxygen for this preliminary stage is due to the fact that it does not oxidize the support 19, which is then exposed because the crucible is empty.

The tip of the cathode is moved to within a few millimeters of the support 19 and an open-circuit voltage of approximately 300 V is applied between the electrode 4 and the torch 5 or 22. The electric arc is struck by a discharge and the cathode is moved away from the support 19 until the desired arc length is obtained. The intensity of the current is fixed at 250 A. The gas flow rates are then adjusted to 30 Nl/mn of argon in the central pipe 33 and 15 Nl/mn in the encapsulating pipe 34. The arc length is brought to 145 mm by moving back the torch 5 or 22 and the voltage becomes approximately 80 V. After 20 minutes thermal equilibrium is reached and the introduction of waste into the crucible commences. After 15 minutes, the electrode 4 is covered and the arc voltage, which has increased as from the introduction of the waste, exceeds 100 V without modifying the setting. The arc is then transferred to the waste, which vitrifies at the root of the arc and then the melted zone propagates to all the waste except the layer solidified on wall 1.

The arc voltage reaches 175 V when 15 Nl/mn of oxygen have been injected by replacing the same argon flow in the encapsulating pipe 34. The electric power is then 55 kW for an average waste charge rate of 3.5 kg/hour. The oxygen has the effect of raising the arc voltage and therefore the electric power, the temperature of the glass bath and its electric conductivity. Thus, on the one hand it stabilizes the plasma column on the glass bath and on the other oxidizes the volatile metals such as chlorides, which could vaporize. It is pointed out that the system only has a slight thermal inertia, because the lowering of the oxygen flow almost immediately leads to a reduction in the arc voltage or the electric power and heat transfers.

When the entire charge has melted, there is a return under the argon plasma, the voltage then drops to 110 V and, to compensate the power drop, the intensity is increased to 450 A in order to avoid an excessive cooling of the bath, which would lead to an increase in the electrical resistivity of the glass and this could result in parasitic attachments of the arc root to the crucible walls. The plasma is then stopped and the glass bath is tapped by the valve and cooled.

The argon is used for protecting the sensitive parts of the equipment and also as an excipient for oxygen, in order to maintain a minimum gas flow through the torches 5 or 22, otherwise they would not function correctly. The use of an oxygen supplement in place of the excipient can produce an excessive energy and temperature for the desired vitrification flow rate and the resistance of the crucible. Any other neutral gas could be used as the excipient and as the striking gas and would have no influence on the vitrification reactions and the like. This is why reference is made to a substantially pure oxygen plasma, the neutral gas finally producing an atmosphere or a low power if is plasma forming.

The temperature to which the wall 1 is cooled is preferably chosen so as to permit a glass layer to solidify on it, but whilst allowing the vapours produced by the vaporization of the waste to pass out of the crucible without condensing on the wall 1. This is important because these vapours are often corrosive and vaporized hydrochloric acid is in particular frequently encountered. However, it is to be hoped that combustion will significantly reduce the production of corrosive vapours in favour of oxides which are less difficult to treat.

The arc could be established between torches of different polarities. It would then be necessary for the molten material to extend into said intermediate space.

The aim of the invention is to ensure the vitrification of organic and mineral waste materials with a high flow rate and involves the supply of a calorific power which the crucible can withstand and the creation of possibly toxic gases.

The oxygen plasma supplies the power and makes the gases given off inoffensive. The good heat conducting, cooled metal crucible makes it possible to dissipate the excess heat whilst assisting the solidification of a protective layer. It is then useful for the crucible to be stationary in order not to complicate the cooling device by rotary joints and this aim is achieved by the valve.

The transfer or passage of the arc through the molten glass bath is an important element in the success of the process. Traversing a non-negligible depth of vitrified material in order to reach the electrode 4 and thus "wrap round" the electric currents, the arc efficiently gives off its heat thereto and the efficiency of the device is consequently satisfactory. It is pointed out that the waste envisaged here is generally constituted by electricity insulating materials at low temperatures, so that appropriate measurements must be taken to initiate vitrification, such as the starting phase described hereinbefore consisting of a progressive filling of the crucible by waste melting in a progressive manner and which do not cover the electrode at the start thereof, followed by normal operation, when part of the argon flow is replaced by oxygen having the effect of increasing the power of the plasma and stabilizing the arc. Moreover, oxygen raised to a very high temperature destroys by oxidation the organic fraction of the waste introduced into the crucible.

We claim:

1. Process for incinerating and vitrifying waste in a stationary crucible by means of at least one plasma torch in the stationary crucible, the stationary crucible having a stainless steel wall provided with outflow channels for a cooling liquid and a tapping valve, the plasma being an arc transferred through a molten waste bath and closing an electric current circuit between the torch and an electrode at a bottom part of the crucible, wherein the plasma comprises a mixing of oxygen and a neutral gas, the arc being initiated using said neutral gas only, the oxygen being progressively substituted for at least part of said neutral gas in order to obtain normal operation.

2. Process for incinerating and vitrifying waste according to claim 1, wherein the wall temperature is raised to a temperature below a solidification point of the vitrified waste and above a condensation point of corrosive vapors given off.

3. Process for incinerating and vitrifying waste according to claim 1, wherein a neutral gas stream is blown into the crucible during the normal operation.

4. Process for incinerating and vitrifying waste according to claim 3, wherein the neutral gas stream is blown through openings made in the wall.

* * * * *